United States Patent [19]

Finlayson

[11] 4,081,496

[45] Mar. 28, 1978

[54] THIXOTROPIC POLYESTER COMPOSITIONS CONTAINING AN ORGANOPHILIC CLAY GELLANT

[75] Inventor: Claude Malcolm Finlayson, Houston, Tex.

[73] Assignee: N L Industries, Inc., New York, N.Y.

[21] Appl. No.: 810,478

[22] Filed: Jun. 27, 1977

[51] Int. Cl.² .............................................. C08L 67/06
[52] U.S. Cl. ................................. 260/864; 260/40 R
[58] Field of Search ............................ 260/40 R, 864

[56] References Cited

U.S. PATENT DOCUMENTS

| | | | |
|---|---|---|---|
| 2,531,427 | 11/1950 | Hauser | 260/448 C |
| 2,642,403 | 6/1953 | Simon | 260/3 |

*Primary Examiner*—Lewis T. Jacobs

[57] ABSTRACT

Thixotropic cross-linkable polyester compositions are provided comprising an unsaturated polyester and an unsaturated aromatic monomer such as styrene having dispersed therein an organophilic clay gellant comprising the reaction product of a smectite-type clay having a cation exchange capacity of at least 75 milliequivalents per 100 grams of clay and a methyl benzyl dialkyl ammonium compound or a dibenzyl dialkyl ammonium compound, said alkyl groups comprising a mixture of long chain alkyl radicals having from 14 to 22 carbon atoms, preferably 16 or 18 and most preferably wherein 20% to 35% of said long chain radicals contain 16 carbon atoms and 10% to 75% of said long chain radicals contain 18 carbon atoms, the amount of said ammonium compound reacted with said clay being from 100 to 120 milliequivalents per 100 grams of clay based on 100% active clay.

The polyester compositions are prepared by a pregel method in which the organophilic clay gellant is mixed with the unsaturated aromatic monomer under high shear to form a pregel and the pregel is then combined with an unsaturated polyester to form the thixotropic compositions.

25 Claims, No Drawings

THIXOTROPIC POLYESTER COMPOSITIONS CONTAINING AN ORGANOPHILIC CLAY GELLANT

This invention is concerned with thixotropic polyester compositions containing as a gelling agent an organophilic clay comprising the reaction product of a smectite-type clay and a methyl benzyl dialkyl ammonium compound or a dibenzyl dialkyl ammonium compound and the preparation of said compositions from a pregel of an unsaturated aromatic monomer containing said organophilic clay.

Unsaturated polyester compositions comprising polyesters based on unsaturated acids or acid anhydrides and diols in admixture with unsaturated aromatic monomers such as styrene have been described heretofore for the production of cross-linked polymers initiated by peroxides. In the preparation of glass fiber-reinformed laminates of these cross-linked polymers, thixotropic gelling agents are employed which decrease the viscosity of the uncross-linked polyester at high shear such as is developed in mixing and spraying but which increase their viscosity at low or no shear to prevent drainage of the composition along the vertical surfaces to which they are applied.

In the past, asbestos and fine particle size silica have acted as efficient gelling agents for such polyester compositions. However, both asbestos and silica, especially fibrous silica, present health hazards; also, silica often reduces the clarity and shelflife of compositions in which it is contained.

In an effort to depart from the use of silica and asbestos as gelling agents, certain organophilic clays, which have heretofore been effective gellants for liquid hydrocarbon systems, have been employed as gellants for unsaturated polyester compositions. Such organophilic clays can be described as the reaction product of a natural or synthetic clay and a higher alkyl-containing quaternary ammonium compound. For purposes of brevity, these organophilic clays are often named as compounds rather than reaction products, e.g. dimethyl dioctadecyl ammonium bentonite or benzyl methyl ditallow ammonium hectorite.

In U.S. Pat. No. 3,014,001 to E. J. Murray for example, glossy air-cured and non-inhibited polyester coatings are described which are prepared from a polymerizable unsaturated polyester compositon which includes an alkyl resin derived from a mixture of maleic anhydride, phthalic anhydride and a diol and a copolymerizable unsaturated monomer such as styrene. The composition also contains an organic peroxide catalyst, a metallic salt drier, a crystalline wax, and an organic onium bentonite such as dimethyl dioctadecyl ammonium bentonite or other organic onium bentonite sold under the registered trademark "BENTONE" of N L Industries, Inc. The polyester compositions of this patent are prepared by first dispersing the bentonite in the unsaturated aromatic monomer and the dispersion is then added to a polyester composition also containing the wax, drier and peroxide catalyst.

In U.S. Pat. No. 3,974,125 to Oswald and Barnum, thixotropic gelling agents for liquid unsaturated polyester compositions are described comprising higher dialkyl dimethyl ammonium clays which are incorporated into the polyester by a pregel process. The pregel process comprises mixing the quaternary ammonium clay with an unsaturated aromatic monomer such as styrene under high shear to form a pregel and then mixing the pregel with a major amount of an unsaturated polyester which may also contain additional monomers to produce a clear and stable gelled polyester having thixotropic properties. The higher dialkyl groups of the dialkyl dimethyl ammonium clays contains from 14 to 24 carbon atoms, preferably 16 to 18 carbon atoms. Dioctadecyl and ditallow groups are cited as most effective. The clays include the natural and synthetic metal and ammonium alumino silicates with the three-layered montmorillonites being preferred. The unsaturated polyester comprises from 50% to 95% by weight of the total composition with the unsaturated aromatic monomer constituting the remainder. The gelling agent concentration in the final polyester composition ranges from 0.25% to 10% by weight of the total composition. In preparing the pregels, the amount of clay gellant can range from 0.5% to 25% and preferably 2% to 12% by weight of the pregel.

Although the organophilic clay gellants such as the dimethyl higher dialkyl ammonium montmorillonites as described in the above patents provide thixotropic properties to the final polyester compositions in which they are incorporated, these gellants do not form handleable pregels at high concentration of organophilic clay, i.e., the pregels are not flowable and are not homogenous mixtures. The pregels of U.S. Pat. No. 3,974,125 containing about 6% clay gellant for example, are grease-like in consistency and cannot be handled further for addition to the polyester without special equipment and cost to the user. At concentrations of gellant greater than 6%, these pregels are so stiff they are virtually unhandleable for further use. Pregels formed from hectorite derivatives of such compounds form acceptable pregels but do not impart the desired rheology to the final polyester composition. This is not only true for the clay gellants of the above patents, but also of other organophilic clays such as trimethyl higher alkyl and dimethyl benzyl higher alkyl bentonites. This restriction on the amount of clay gellant which can be used to form handleable pregels, in turn limits the amount of clay gellant which can be incorporated into the final polyester composition because the maximum amount of unsaturated aromatic monomer which can be combined with the polyester is also limited. For example, if a polyester formulation comprising 70% unsaturated polyester and 30% styrene by weight is combined with additional styrene and a thickener, the maximum amount of styrene which can be added is limited by a ratio of 58 parts by weight of ester to 42 parts by weight of styrene. Therefore the gellant concentration in the styrene pregel dictates the gellant concentration in the final polyester composition; it cannot be increased by attempts to increase the styrene.

In U.S. Pat. No. 3,974,125, the 6% concentration of gellant in the styrene pregel limited the amount of gellant which could be incorporated in the unsaturated polyester compositions of the examples to about 1.5%. When it was desired to prepare thixotropic unsaturated polyester compositions containing greater than 1.5% gellant, resort was made to the direct addition of gellant to an unsaturated polyester resin as in Example 7.

The present invention on the other hand provides thixotropic polyester compositions prepared by the pregel method containing novel organophilic clay gellants which when mixed with unsaturated aromatic monomer at high concentrations form soft and handleable pregels and at the same time impart excellent rheology to the polyester compositions in which they are incorporated. The polyester compositions and pregels formed with these gellants are characterized by high viscosities at low shear rates and high thixotropic indices. Thixotropic Index as defined herein is the ratio of the Brookfield viscosity in cps at 10 r.p.m. (numerator) and 100 r.p.m. (denominator); each measurement taken after the same time of stirring, at the same temperature and using the same spindle.

The present invention provides a thixotropic cross-linkable polyester composition and process for preparing said composition by the pregel method wherein the polyester composition comprises an unsaturated polyester and an unsaturated aromatic monomer having dispersed therein an organophilic clay gellant comprising the reaction product of a smectite-type clay having a cation exchange capacity of at least 75 milliequivalents per 100 g of clay and a methyl benzyl dialkyl ammonium compound or a dibenzyl diakyl ammonium compound, wherein the alkyl groups contain 14 to 22 carbon atoms, and the amount of said ammonium compound reacted with said clay being from 100 to 120 milliequivalents per 100 g of clay based upon 100% active clay.

The polyester composition of this invention is prepared by the pregel method which comprises mixing the organophilic clay gellant with the unsaturated aromatic monomer under high shear to form a thixotropic pregel and combining this pregel with a liquid unsaturated polyester which may also contain additional unsaturated aromatic monomer under low shear to form the thixotropic polyester composition. The final polyester composition can then be cross-linked to produce coatings or glass fiber-reinforced laminates as well known in the art.

In a typical procedure, clay gellant and an unsaturated aromatic monomer such as styrene are mixed in a Cowles dispersator or other high shear apparatus and stirred for ten minutes at 2000 r.p.m. to form a soft and handleable pregel. This pregel is then added to an unsaturated polyester and additional styrene under low shear to form a polyester composition having a high thixotropic index and excellent rheology.

The clays used to prepare the organophilic clay gellants of this invention are smectite-type clays which have a cation exchange capacity of at least 75 milliequivalents per 100 grams of clay. Particularly desirable types of clay are the naturally-occurring Wyoming varieties of swelling bentonites and like clays, and hectorite, a swelling magnesium-lithium silicate clay.

The clays, especially the bentonite type clays, are preferably converted to the sodium form if they are not already in this form. This can conveniently be done by preparing an aqueous clay slurry and passing the slurry through a bed of cation exchange resin in the sodium form. Alternatively, the clay can be mixed with water and a soluble sodium compound such as sodium carbonate, sodium hydroxide and the like and shearing the mixture with a pugmill or extruder.

Smectite-type clays prepared synthetically by either a pneumatolytic or, preferably a hydrothermal synthesis process can also be used to prepare the present organophilic clays. Representative of such clays are Montmorillonite, Bentonite, Beidellite, Hectorite, Saponite and Stevensite. These clays may be synthesized hydrothermally by forming an aqueous reaction mixture in the form of a slurry containing mixed hydrous oxides or hydroxides of the desired metals with or without, as the case may be, sodium (or alternate exchangeable cation of mixture thereof) fluoride in the proportions for the particular synthetic smectite desired. The slurry is then placed in an autoclave and heating under autogenous pressure to a temperature within the range of approximately 100° to 325° C, preferably 274° to 300° C, for a sufficient period of time to form the desired product. Representative hydrothermal processes for preparing synthetic smectites are described in the following U.S. patents, incorporated herein by reference; U.S. Pat. Nos. 3,252,757 to Granquist; 3,586,478 to Neumann; 3,666,407 to Orlemann; 3,671,190 to Neumann; 3,844,978 and 3,844,979 to Hickson; and 3,852,405 and 3,855,147 to Granquist.

The cation exchange capacity of the smectite clays can be determined by the well-known ammonium acetate method.

The quaternary ammonium compounds which are reacted with these smectite-type clays are methyl benzyl dialkyl or dibenzyl dialkyl ammonium salts, the alkyl groups comprising a mixture of alkyl radicals having from 14 to 22 carbon atoms, preferably 16 or 18 carbon atoms and most preferably 20% to 35% of the alkyl radicals contain 16 carbon atoms and 60% to 75% contain 18 carbon atoms. The salt anion is preferably selected from the group consisting of chloride and bromide, and mixtures thereof, and is more preferably chloride, although other anions such as acetate, hydroxide, nitrite, etc., may be present in the quaternary ammonium salt to neutralize the quaternary ammoniun cation. These quaternary ammonium salts can be represented by the formula;

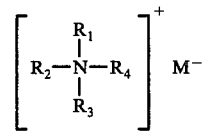

wherein $R_1$ is $CH_3$ or $C_6H_5CH_2$; $R_2$ is $C_6H_5CH_2$; and $R_5$ and $R_4$ are alkyl groups containing long chain alkyl radicals having 14 to 22 carbon atoms, and most preferably wherein 20 to 35% of said long chain alkyl radicals contain 16 carbon atoms and 60% to 75% of said long chain alkyl radicals contain 18 carbon atoms; and wherein M is selected from the group consisting of chloride, bromide, nitrite, hydroxyl, acetate, methyl sulfate and mixtures thereof.

The preferred quaternary ammonium salt is methyl benzyl dihydrogenated tallow ammonium chloride. Commercially prepared hydrogenated tallow typically analyzes 2.0% $C_{14}$, 0.5% $C_{15}$, 29.0% $C_{16}$, 1.5% $C_{17}$; 66.0% $C_{18}$ and 1.0% $C_{20}$ alkyl radicals.

The organophilic clays of this invention can be prepared by admixing the clay, quaternary ammoniuum compound and water together, preferably at a temperature within the range of from 100° F (38° C) to 180° F (82° C), more preferably from 140° F (60° C) to 170° F (77° C) for a period of time sufficient for the organic quaternary ammonium compound to coat the clay particles, followed by filtering, washing, drying, and grinding. If using the organophilic clays in emulsions, the drying and grinding steps may be eliminated. When admixing the clay, quaternary ammonium compound and water in such concentrations that a slurry is not formed, then the filtration and washing steps can be eliminated.

Preferably the clay is dispersed in water at a concentration from about 3% to 7% by weight, the slurry optionally centrifuged to remove non-clay impurities which constitute about 10% to about 50% by weight of the starting clay composition; the slurry agitated and heated to a temperature in the range of from 140° F (60° C) to 170° F (77° C); the quaternary amine salt added to the desired milliequivalent ratio, preferably as a liquid in isopropanol or dispersed in water; and the agitation continued to effect the reaction.

The amount of the quaternary ammonium compound added to the clay for purposes of this invention must be sufficient to impart to the clay the enhanced dispersion characteristics desired. The mulliequivalent ratio is defined as the number of milliequivalents of the quaternary ammonium compound in the organophilic clay, per 100 grams of clay, 100% active basis. The organophilic clays of this invention have a milliequivalent ratio of from 100 to 120. At lower milliequivalent ratios the organophilic clays are ineffective gellants even though they may be effective gellants when dispersed in a conventional manner with a polar additive. At higher milliequivalent ratios the organophilic clays are poor gellants. However, the preferred milliequivalent ratio within the range of from 100 to 120 will vary depending on the characteristics of the organic system to be gelled by the organophilic clay.

The unsaturated aromatic monomers of this invention are aromatic compounds to which is bonded one or more ethylenically unsaturated radicals such as a vinyl radical, substituted vinyl radical or an allylic radical. Suitable monomers include styrene, α-methyl styrene, divinyl benzene and allyl benzene. Styrene is preferred due to its effectiveness, wide use and availability. Such monomers are used in cross-linking the polyesters and also act as diluents to reduce viscosity.

The unsaturated polyesters useful in preparing the thixotropic compositions of this invention are polyesters of a dicarboxylic acid and a diol having a major amount of olefinic unsaturation, preferably 10 to 75 olefin groups per 100 ester groups. The olefinic unsaturation is preferably derived from the carboxylic acid although the diol may also be unsaturated. Typical diols are ethylene glycol and propylene glycol. Typical unsaturated acids include maleic acid, fumaric acid and phthalic acid. Anhydrides of these acids are also commonly used. Such polyesters are made by conventional techniques of esterification as well known in the art. Generally, polyesters having molecular weights of from about 400 to 10,000 and acid numbers in the range of from 35 to 45 mg KOH per gram of resin are useful for preparing thixotropic compositions of this invention.

The amounts of organophilic clay gellant used in forming the pregels of this invention can range from 0.25% to 40% by weight of the pregel. In the case of styrene, the upper limit is about 20% by weight of the pregel. Preferably, the amount of clay gellant comprises from 6% to 14% by weight of the pregel. Within these ranges, soft pregels are formed which can be easily handled for further addition to the unsaturated polyester. By attaining such high gellant concentrations in the pregels, amounts of clay gellant in the polyester compositions can be up to 4% by weight of the total composition or more while providing excellent rheologies to the system.

The amounts of unsaturated polyester in the final polyester composition can range from at least 40% and preferably from about 50% to 95% by weight with the remainder being unsaturated aromatic monomer.

Pregels based on organophilic bentonite clays, particularly dimethyl benzyl dihydrogenated tallow ammonium bentonite, provide excellent pregels and impart the best rheologies to the polyester compositions. Organophilic clays based on hectorite give soft pregels but rheologies are somewhat poorer than the bentonite-based clay gellants.

In order to more completely describe the present invention, the following examples are given. All percentages given are based upon weight unless otherwise indicated.

EXAMPLE 1

About 350 gallons of a 3% slurry of Wyoming bentonite in water which had been previously treated by centrifugation to remove all non-clay impurities and ion-exchanged to provide the clay in the sodium form was heated to about 150° F and combined with 74 lbs. of 77.8% active methyl benzyl dihydrogenated tallow ammonium chloride. The mixture was stirred for 45 minutes, filtered to remove solids, dried at 150° F and finally ground to yield an organophilic clay gellant containing 110.8 milliequivalents of quaternary ammonium compound per 100 grams of clay.

A styrene pregel was prepared by mixing 18 parts by weight of the methyl benzyl dihydrogenated tallow ammonium bentonite prepared above (MBDTA Bentonite) with 162 parts by weight of styrene in a Cowles dispersator at 2000 r.p.m. for ten minutes. The resulting pregel was a soft past containing 10% by weight of the clay gellant. Sixty grams of this pregel were added to 240 grams of an unsaturated polyester formulation comprising 70% of an unsaturated polyester resin and 30% styrene (Polyester 32-125) in a Cowles dispersator and stirred for ten minutes at 2000 r.p.m. The resulting polyester composition contained 58% polyester and 42% styrene having dispersed therein 2% of the clay gellant.

For comparison purposes, 6 grams of fine particle size silica was added to 219 grams of the above 70% polyester-30% styrene formulation and 75 grams of styrene in a Cowles dispersator and stirred at 2000 r.p.m. for ten minutes to form a thickened polyester composition containing 2% silica. The silica could not be added to styrene alone to form a pregel because of its bulk.

Viscosity data for both polyester compositions are given below in Table I. The viscosity determinations were made using a Brookfield RVT viscometer using a No. 5 spindle.

TABLE I

| Organophilic Clay Gellant | Brookfield Viscosities (cps) at Various Stirring Rates R.P.M. | | | | Thixotropic Index (Ratio of Viscosities at 10 & 100 r.p.m.) |
|---|---|---|---|---|---|
| | 10 | 20 | 50 | 100 | |
| MBDTA Bentonite | 3000 | 1440 | 1136 | 680 | 4.40 |
| Silica | 1120 | 200 | 400 | 264 | 4.24 |

The table shows that the polyester composition made with MBDTA Bentonite using the pregel method had a higher thixotropic index than the standard silica gelled composition.

In addition, the MBDTA Bentonite gelled styrene was soft and easily handled. The polyester composition in which it was incorporated had excellent rheology.

EXAMPLE 2

In this example, the polyester composition of Example 1, made by the pregel method using methyl benzyl dihydrogenated tallow ammonium bentonite (MBDTA Bentonite) was compared to seven other polyesters also made by the pregel method but containing as the organophilic clay gellant:

(a) trimethyl hydrogenated tallow ammonium bentonite. (TMTA Bentonite)

(b) trimethyl hydrogenated tallow ammonium bentonite and a polar additive. (TMTA Bentonite-P.A.)

(c) dimethyl dihydrogenated tallow ammonium bentonite. (DMDTA Bentonite)

(d) dimethyl dihydrogenated tallow ammonium hectorite. (DMDTA Hectorite)

(e) dimethyl dihydrogenated tallow ammonium bentonite and a polar additive. (DMDTA Bentonite-P.A.)

(f) dimethyl benzyl hydrogenated tallow ammonium bentonite. (DMBTA Bentonite)

(g) dimethyl benzyl hydrogenated tallow ammonium hectorite. (DMBTA Hectorite)

In each of the comparison polyester compositions, a 7.4% pregel of styrene was prepared by mixing 18.5 g of clay gellant with 231.5 g of styrene (or 229.5 g of styrene and 2.5 g of 95% methanol as the polar additive where applicable) in a Cowles dispersator and stirring at 2000 r.p.m. for ten minutes. To 219 g of the 70% polyester-30% styrene formulation of Example 1 in a Cowles dispersator was added 81 g of the pregel followed by stirring at 2000 r.p.m. for ten minutes to form a polyester composition containing 58% polyester and 42% styrene having dispersed therein 2% of clay gellant. Viscosity measurements, Thixotropic Indices, pregel characteristics and rheologies of the polyester compositions are summarized in Table 2 below. Viscosity determinations were made with a Brookfield RVT viscometer using a No. 5 spindle.

mixing thus rendering them unhandeable for preparing the final polyester compositions.

EXAMPLE 3

In this example, another organophilic clay gellant according to the invention, methyl benzyl dihydrogenated tallow ammonium hectorite clay (MBDTA Hectorite), was used to prepare a 7.4% styrene pregel which was then added to a polyester-styrene formulation to form a polyester composition containing 2% gellant. The gellant was prepared using a similar procedure as set forth in Example 1 from a hectorite clay having a cation exchange capacity of at least 75 milliequivalents per 100 g of clay.

Exactly 18.5 g of this clay gellant was mixed with 231.5 of styrene in a Cowles dispersator for ten minutes at 2000 r.p.m. The Brookfield viscosities of the resulting pregel was determined at various r.p.m.'s with a Brookfield RVT viscometer using a No. 5 spindle and the condition of the pregel noted. Then 81 g of this pregel was added to 219 g of the 70% polyester-30% styrene formulation of Example 1 in a Cowles dispersator and stirred for ten minutes at 2000 r.p.m. Viscosities of the polyester composition so formed was determined as above. The results are given in Table III below.

TABLE III

| MBDTA Hectorite in: | Brookfield Viscosities (cps) at Various Stirring Rates R.P.M. | | | | Thixotropic Index (Ratio of Viscosities at 10 & 100 r.p.m.) |
|---|---|---|---|---|---|
| | 10 | 20 | 50 | 100 | |
| 7.4% Styrene Pregel | 2000 | 1100 | 456 | 240 | 8.33 |
| 2.0% Polyester | 1000 | 650 | 400 | 285 | 3.51 |

The pregel was as soft and handleable as the pregel of MBDTA Bentonite. Rheology of the 2% polyester composition was good.

TABLE II

| Organophilic Clay Gellant | Brookfield Viscosities (cps) at Various Stirring Rates R.P.M. | | | | Thixotropic Index (Ratio of Viscosities at 10 & 100 r.p.m.) | Pregal Characteristics | Rheology of Polyester Composition |
|---|---|---|---|---|---|---|---|
| | 10 | 20 | 50 | 100 | | | |
| MBDTA Bentonite | 3000 | 1440 | 1136 | 680 | 4.40 | soft; pourable & easily handled | excellent |
| TMTA Bentonite | 1080 | 700 | 416 | 292 | 3.70 | pasty; stiff; non-uniform; cavitates on stirring | good |
| TMTA Bentonite-P.A. | 1880 | 1140 | 632 | 428 | 4.39 | diffficult to mix; stiff; cavitates | good |
| DMDTA Bentonite* | 2000 | 1240 | 696 | 460 | 4.35 | stiff; unhandleable | good |
| DMDTA Hectorite* | 760 | 500 | 304 | 228 | 3.45 | soft | poor |
| DMDTA Bentonite*P.A. | 1080 | 700 | 400 | 290 | 3.72 | very stiff; cavitates unhandleable | good |
| DMBTA Bentonite | 1600 | 1000 | 576 | 400 | 4.00 | very stiff; un-handleable | good |
| DMBTA Hectorite | 520 | 380 | 264 | 208 | 2.50 | stiff; barely handleable | poor |

*Organophilic clays as disclosed in U.S. Pat. No. 3,974,125

Table II shows that the organophilic clay gellant of this invention (MBDTA Bentonite) imparts higher viscosities to the polyester compositions, a higher Thixotropic Index and a better rheology than the comparison examples. Moreover, the pregels formed using the clay gellant of this invention are softer and more easily handled than any of the other gellants which are either too stiff, too difficult to form by mixing or cavitate during

EXAMPLE 4

In this example, two other organophilic clay gellants according to the invention, dibenzyl dihydrogenated tallow ammonium hectorite (DBDTA Hectorite) and dibenzyl dihydrogenated tallow ammonium bentonite (DBDTA Bentonite), were used to prepare 7.4% styrene pregels, each of which were combined with polyester formulations to form polyester compositions containing 2% gellant.

Exactly 18.5 g. of each clay gellant was mixed with 231.5 g of styrene in a Cowles dispersator for ten minutes at 2000 r.p.m. The Brookfield viscosities of each pregel was determined at various r.p.m.'s with a Brookfield RVT viscometer using a No. 5 spindle and the condition of the pregel noted.

Exactly 81 g of this pregel was added to 219 g of the 70% polyester-30% styrene formulation of Example 1 in a Cowles dipersator and stirred at 2000 r.p.m. for ten minutes. The viscosities of the polyester compositions were determined as above. The results are summarized in Table IV.

TABLE IV

| Composition | Brookfield Viscosities (cps) at Various Stirring Ranges R.P.M. | | | | Thixotropic Index (Ratio of Viscosities at 10 & 100 r.p.m.) |
|---|---|---|---|---|---|
| | 10 | 20 | 50 | 100 | |
| A. Styrene Pregel | | | | | |
| DBDTA Bentonite | 7720 | 4140 | 1744 | 928 | 8.32 |
| DBDTA Hectorite | 4080 | 2100 | 840 | 428 | 9.53 |
| B. Polyester | | | | | |
| DBDTA Bentonite | 2000 | 1240 | 680 | 452 | 4.42 |
| DBDTA Hecorite | 880 | 580 | 360 | 260 | 3.38 |

Both pregels were acceptable as to softness and handleability. The rheology of the polyester composition made with DBDTA Bentonite was very good; the rheology of the polyester made with DBDTA Hectorite was poorer.

The invention being thus described, it will be obvious that the same may be varied in many ways. Such variations are not to be regarded as a departure from the spirit and scope of the invention and all such modifications are intended to be included within the scope of the following claims.

What is claimed is:

1. A thixotropic cross-linkable polyester composition comprising an unsaturated polyester and an unsaturated aromatic monomer having dispersed therein an organophilic clay gellant comprising the reaction product of a smectite-type clay having a cation exchange capacity of at least 75 milliequivalents per 100 grams of clay and a methyl benzyl dialkyl ammonium compound or a dibenzyl dialkyl ammonium compound, wherein the alkyl groups contain 14 to 22 carbon atoms and the amount of said ammoniuum compound reacted with said clay being from 100 to 120 milliequivalents per 100 grams of clay based upon 100% active clay.

2. The polyester composition of claim 1 wherein said unsaturated aromatic monomer is styrene.

3. The polyester composition of claim 1 wherein said clay is hectorite or sodium bentonite.

4. The polyester composition of claim 1 wherein said alkyl groups are 16 or 18 carbon atoms.

5. The polyester composition of claim 1 wherein said unsaturated polyester comprises at least 40% of said composition.

6. The polyester composition of claim 1 wherein said organophilic clay gellant comprises up to 4% by weight of said composition.

7. A thixotropic cross-linkable polyester composition comprising an unsaturated polyester and an unsaturated aromatic monomer having dispersed therein an organophilic clay gellant comprising the reaction product of a smectite-type clay selected from the group consisting of hectorite and sodium bentonite, and a methyl benzyl dialkyl ammonium compound or a dibenzyl dialkyl ammonium compound, said dialkyl groups comprising a mixture of long chain alkyl radicals, wherein 20% to 35% of said long chain alkyl radicals contain 16 carbon atoms and 60% to 75% of said long chain alkyl radicals contain 18 carbon atoms, the amount of said ammonium compound reacted with said clay being from 100 to 120 milliequivalents per 100 grams of clay based upon 100% active clay, wherein said unsaturated polyester comprises at least 40% of said composition and wherein said organophilic clay gellant comprises up to 4% by weight of said composition.

8. A thixotropic polyester composition comprising an unsaturated polyester and styrene having dispersed therein an organophilic clay gellant comprising the reaction product of a hectorite or sodium bentonite clay having a cation exchange capacity of at least 75 milliequivalents per 100 grams of clay and a quaternary ammonium compound represented by the formula;

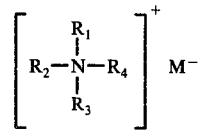

wherein $R_1$ is $CH_3$ or $C_6H_5CH_2$; $R_2$ is $C_6H_5CH_2$; and $R_3$ and $R_4$ are each a hydrogenated tallow group; and M is selected from the group consisting of chloride, bromide, nitrite, hydroxyl, acetate, methyl sulfate and mixtures thereof; and wherein the amount of ammonium compound reacted with said clay is from 100 to 120 milliequivalents per 100 grams of clay based on 100% active clay.

9. The polyester composition of claim 8 wherein said organophilic clay comprises the reaction product of a sodium bentonite and methyl benzyl dihydrogenated tallow ammonium chloride.

10. The polyester of claim 8 wherein said organophilic clay comprises the reaction product of a sodium bentonite and dibenzyl dihydrogenated tallow ammonium chloride.

11. The polyester of claim 8 wherein said organophilic clay comprises the reaction product of hectorite with methyl benzyl dihydrogenated tallow ammonium chloride.

12. The polyester composition of claim 8 wherein said organophilic clay comprises the reaction product of hectorite with dibenzyl dihydrogenated tallow ammonium chloride.

13. The polyester composition of claim 8 wherein said organophilic clay gellant comprises up to 4% by weight of said total composition.

14. A process for preparing thixotropic unsaturated polyester composition comprising;
(a) forming a pregel of an aromatic unsaturated monomer with an organophilic clay gellant comprising the reaction product of a smectite-type clay having a cation exchange capacity of at least 75 milliequivalents per 100 grams of clay and a methyl benzyl dialkyl ammonium compound or a dibenzyl dialkyl ammonium compound, wherein the alkyl groups contain 14 to 20 carbon atoms, the amount of said ammonium compound reacted with said clay being from 100 to 120 milliequivalents per 100 grams of clay based on 100% active clay; and
(b) combining said pregel with a liquid unsaturated polyester to form a thixotropic composition.

15. The process of claim 14 wherein the clay gellant comprises from 0.25% to 40% by weight of said pregel.

16. The process of claim 15 wherein the clay gellant comprises from 6% to 14% of said pregel.

17. The process of claim 14 wherein said pregel is added to said liquid unsaturated polyester.

18. The process of claim 14 wherein said alkyl groups contain a mixture of long chain alkyl radicals, wherein 20% to 35% of said long chain alkyl radicals contain 16 carbon atoms and 60% to 75% of said long chain alkyl radicals contain 18 carbon atoms.

19. A process for preparing thixotropic unsaturated polyester composition comprising;
    (a) forming a pregel of an aromatic unsaturated monomer with an organophilic clay gellant comprising the reaction product of a smectite-type clay having a cation exchange capacity of at least 75 milliequivalents per 100 grams of clay and a methyl benzyl dialkyl ammonium compound or a dibenzyl dialkyl ammonium compound, said dialkyl groups comprising a mixture of long chain alkyl radicals, wherein 20% to 35% of said long chain alkyl radicals contain 16 carbon atoms and 60% to 75% of said long chain alkyl radicals contain 18 carbon atoms, the amount of said ammonium compound reacted with said clay being from 100 to 120 milliequivalents per 100 grams of clay based on 100% active clay; and
    (b) combining said pregel with a liquid unsaturated polyester to form a thixotropic composition.

20. The process of claim 19 wherein the clay gellant comprises from 0.25% to 40% by weight of said pregel.

21. The process of claim 20 wherein the clay gellant comprises from 6% to 14% of said pregel.

22. The process of claim 19 wherein said pregel is added to said liquid unsaturated polyester.

23. A process for preparing a thixotropic unsaturated polyester composition comprising;
    (a) mixing styrene under high shear with an organophilic clay gellant comprising the reaction product of a hectorite or sodium bentonite clay having a cation exchange capacity of at least 75 milliequivalents per 100 grams of clay and a quaternary ammonium compound represented by the formula;

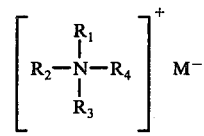

wherein $R_1$ is $CH_3$ or $C_6H_5CH_2$; $R_2$ is $C_6H_5CH_2$; and $R_3$ and $R_4$ are each a hydrogenated tallow group; and M is selected from the group consisting of chloride, bromide, nitrite, hydroxyl, acetate, methyl sulfate and mixtures thereof; and wherein the amount of ammonium compound reacted with said clay is from 100 to 120 milliequivalents per 100 grams of clay, based on 100% active clay, to form a pregel; and
    (b) adding said pregel to a liquid unsaturated polyester under low shear to form said thixotropic polyester composition.

24. The process of claim 23 wherein the amount of clay gellant in the pregel is from 0.25 to 40% by weight of said pregel.

25. The process of claim 24 wherein the amount of clay gellant in the pregel is from 6% to 14% by weight of said pregel.

UNITED STATES PATENT OFFICE
CERTIFICATE OF CORRECTION

Patent No. 4,081,496                     Dated   March 28, 1978

Inventor(s)   Claude Malcolm Finlayson

It is certified that error appears in the above-identified patent and that said Letters Patent are hereby corrected as shown below:

Column 4, line 4, "heating" should read --heated--.

Column 4, line 41, "$R_5$" should read --$R_3$--.

Column 5, line 7, "added to" should read --added in--.

Column 5, line 14, "mulliequivalent" should read --milliequivalent--.

Table IV, column 9, line 17, "(Ratio of Viscosities at 10 10 & 100 r.p.m.)" should read --(Ratio of Viscosities at 10 & 100 r.p.m.)--.

Table IV, column 9, line 23, "Hecorite" should read --Hectorite--.

Signed and Sealed this

Third Day of April 1979

[SEAL]

Attest:

RUTH C. MASON
Attesting Officer

DONALD W. BANNER
Commissioner of Patents and Trademarks